(12) United States Patent
Mehrnami

(10) Patent No.: US 12,388,289 B2
(45) Date of Patent: Aug. 12, 2025

(54) ACCESSORY DEVICE FOR MANAGING MULTIPLE POWER SOURCES

(71) Applicant: BOSE CORPORATION, Framingham, MA (US)

(72) Inventor: Siamak Mehrnami, Watertown, MA (US)

(73) Assignee: Bose Corporation, Framingham, MA (US)

( * ) Notice: Subject to any disclaimer, the term of this patent is extended or adjusted under 35 U.S.C. 154(b) by 196 days.

(21) Appl. No.: 18/454,138

(22) Filed: Aug. 23, 2023

(65) Prior Publication Data

US 2025/0070591 A1    Feb. 27, 2025

(51) Int. Cl.
*H02J 9/06* (2006.01)
*H02J 7/00* (2006.01)

(52) U.S. Cl.
CPC . *H02J 9/06* (2013.01); *H02J 7/00* (2013.01)

(58) Field of Classification Search
CPC ...................................... H02J 9/06; H02J 7/00
USPC .......................................................... 307/64
See application file for complete search history.

(56) References Cited

U.S. PATENT DOCUMENTS 8,841,798 B2 * 9/2014 Tuukkanen ............... H02J 9/00
307/65

* cited by examiner

*Primary Examiner* — Michael R. Fin
(74) *Attorney, Agent, or Firm* — Patterson + Sheridan, LLP

(57) ABSTRACT

Aspects of the present disclosure provide techniques, including devices and systems implementing the techniques, for managing multiple power sources using an accessory device. One example accessory device includes a first power supply node configured to receive power from an alternative power source, a second power supply node configured to be coupled to a universal serial bus (USB)-C plug of a primary power source, an output power supply node configured to be coupled to a USB-C receptacle, and a management circuit. The management circuit includes an input node coupled to a first control configuration (CC) input line and a second CC input line; a first output node coupled to a first CC output line; and a second output node coupled to a second CC output line. The management circuit is configured to maintain an impedance of the CC input lines and CC output lines within a range.

20 Claims, 5 Drawing Sheets

ACCESSORY DEVICE FOR MANAGING MULTIPLE POWER SOURCES

TECHNICAL FIELD

Aspects of the disclosure generally relate to an accessory device and, more particularly, to techniques and apparatus for managing multiple power sources.

BACKGROUND

Wireless devices are widely utilized by users for a variety of activities. For example, wireless devices may be used to output audio for the entertainment of a user. These wireless devices may be capable of being charged by one or more power sources. In some cases, a wireless device may be capable of being charged by certain types of power sources, but be incapable of being charged via other types of power sources. For example, a wireless device may be capable of being charged via an input cable (e.g., a universal serial bus (USB) plug) coupled to a first power source (e.g., an electrical outlet, a portable battery, or another device), but not be capable of being charged via certain alternative power sources (e.g., a wireless charger).

Accordingly, there exists a need for further improvements to enable an accessory device used in conjunction with the wireless device to facilitate charging of the wireless device via multiple power sources, as well as manage the multiple power sources to ensure compliance with various standards associated with the multiple power sources and the wireless device.

SUMMARY

All examples and features mentioned herein can be combined in any technically possible manner.

Aspects of the present disclosure provide a device. The device generally includes a first power supply node configured to receive power from an alternative power source, a second power supply node configured to be coupled to a universal serial bus (USB)-C plug of a primary power source, an output power supply node configured to be coupled to a USB-C receptacle, where the output power supply node is configured to be coupled to the first power supply node and the second power supply node, and a management circuit. The management circuit generally includes an input node coupled to a first control configuration (CC) input line and a second CC input line, where the first CC input line and the second CC input line are coupled between the second power supply node and the management circuit, a first output node coupled to a first CC output line, and a second output node coupled to a second CC output line, where the first CC output line and the second CC output line are both coupled between the management circuit and the output power supply node, where the first CC input line and the second CC input line are coupled to the second CC output line, and where the management circuit is configured to maintain an impedance of the first CC input line, the second CC input line, the first CC output line, and the second CC output line within a range.

In aspects, the management circuit further includes a first resistor coupled to the first CC output line, and a switch coupled between the first power supply node, the second power supply node, and the first resistor, where the range is based, at least in part, on at least one USB-C standard associated with the first CC input line and the second CC input line, and where the management circuit is further configured to pull up a voltage at the first CC output line or a voltage at the second CC output line.

In aspects, when the first power supply node is receiving power from the alternative power source and the second power supply node is not coupled to the USB-C plug, the management circuit is configured to close the switch, and pull up the voltage at the first CC output line to a voltage at the first power supply node using the first resistor.

In aspects, when the first power supply node is not receiving power from the alternative power source and the second power supply node is not coupled to the USB-C plug, the management circuit is configured to open the switch such that the first CC output line is floating.

In aspects, when the first power supply node is not receiving power from the alternative power source and the second power supply node is coupled to the USB-C plug: the management circuit is configured to open the switch such that the first CC output line is floating, the second CC output line is shorted to the first CC input line and the second CC input line, the output power supply node is coupled to the USB-C receptacle, the USB-C receptacle is coupled to another device, and the other device pulls up the first CC input line and the second CC input line.

In aspects, when the first power supply node is receiving power from the alternative power source and the second power supply node is coupled to the USB-C plug: the management circuit is configured to open the switch such that the first CC output line is floating, the second CC output line is shorted to the first CC input line and the second CC input line, the output power supply node is coupled to the USB-C receptacle, the USB-C receptacle is coupled to another device, and the other device pulls up the first CC input line and the second CC input line.

In aspects, a value of the first resistor is based on at least one of a USB-C standard or an output current rating of the alternative power source.

In aspects, the switch includes a transistor, and where a gate of the transistor is coupled to the second power supply node.

In aspects, the management circuit further includes a second resistor and a third resistor both coupled between the gate of the transistor and the second power supply node, the second resistor is configured to be a pull up resistor for the gate of the transistor, and the third resistor is configured to be a pull down resistor for the gate of the transistor.

In aspects, the alternative power source includes a wireless charger.

In aspects, the device further includes a data line pass through configured to be coupled between at least one data line of the USB-C plug and at least one data line of the USB-C receptacle.

In aspects, the device further includes a power multiplexer (MUX), including a first input coupled to the first power supply node, a second input coupled to the second power supply node, and an output coupled to the output power supply node.

In aspects, when a voltage at the first power supply node and a voltage at the second power supply node are each valid, the power MUX is configured to select the second power supply node.

Aspects of the present disclosure provide a device. The device generally includes a device. The device generally includes a first power supply node configured to receive power from an alternative power source, a second power supply node configured to be coupled to a universal serial bus (USB)-C plug of a primary power source, an output power supply node configured to be coupled to a USB-C receptacle, where the output power supply node is configured to be coupled to the first power supply node and the second power supply node, and a management circuit. The management circuit generally includes an input node coupled to a first control configuration (CC) input line and a second CC input line, where the first CC input line and the second CC input line are coupled between the second power supply node and the management circuit, a first output node coupled to a first CC output line, and a second output node coupled to a second CC output line, where the first CC output line and the second CC output line are both coupled between the management circuit and the output power supply node, where the first CC input line and the second CC input line are coupled to the second CC output line, and where the management circuit is configured to pull up a voltage at the first CC output line or the second CC output line.

Aspects of the present disclosure provide a method for routing power to a first device. The method generally includes routing power from a first power supply node of a second device or a second power supply node of the second device to an output power supply node of the second device, where the first power supply node is configured to receive power from an alternative power source, where the second power supply node is configured to be coupled to a universal serial bus (USB)-C plug of a primary power source, and where the output power supply node is configured to be coupled to the first device via a USB-C receptacle, and maintaining, using a management circuit, an impedance of a first control configuration (CC) input line, a second CC input line, a first CC output line, and a second CC output line within a range, where the first CC input line and the second CC input line are coupled to the second CC output line.

In aspects, the management circuit includes a first resistor coupled to the first CC output line, and a switch coupled between the first power supply node, the second power supply node, and the first resistor, where the range is based, at least in part, on at least one USB-C standard associated with the first CC input line and the second CC input line, and where the management circuit is further configured to pull up a voltage at the first CC output line or a voltage at the second CC output line.

In aspects, when the first power supply node is receiving power from the alternative power source and the second power supply node is not coupled to the USB-C plug, the management circuit is configured to close the switch, and pull up the voltage at the first CC output line to a voltage at the first power supply node using the first resistor.

In aspects, when the first power supply node is not receiving power from the alternative power source and the second power supply node is not coupled to the USB-C plug, the management circuit is configured to open the switch such that the first CC output line is floating.

In aspects, when the first power supply node is not receiving power from the alternative power source and the second power supply node is coupled to the USB-C plug: the management circuit is configured to open the switch such that the first CC output line is floating, the second CC output line is shorted to the first CC input line and the second CC input line, the output power supply node is coupled to the USB-C receptacle, the USB-C receptacle is coupled to another device, and the other device pulls up the first CC input line and the second CC input line.

In aspects, when the first power supply node is receiving power from the alternative power source and the second power supply node is coupled to the USB-C plug: the management circuit is configured to open the switch such that the first CC output line is floating, the second CC output line is shorted to the first CC input line and the second CC input line, the output power supply node is coupled to the USB-C receptacle, the USB-C receptacle is coupled to another device, and the other device pulls up the first CC input line and the second CC input line.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements, and "speech" and "dialogue" may be used interchangeably.

DETAILED DESCRIPTION

Certain aspects of the present disclosure provide techniques and apparatus for managing multiple power sources using an accessory device that includes a management circuit. Such an accessory device may be an accessory device used in conjunction with a primary device. The accessory device may be capable of receiving power via different power sources, and routing that power to the primary device. In some cases, the accessory device may be receiving power from multiple power sources. For example, the accessory device may be coupled to a primary power source (e.g., an external power adapter, a portable battery, or another device) via an input (e.g., a universal serial bus (USB)-C receptacle) and also be receiving power from one or more alternative power sources (e.g., a wireless charger, a backup battery, and/or an external power adapter). The accessory device may be configured to multiplex the power supply of the primary device between the primary power source and the alternative power sources using a power multiplexer (MUX). The accessory device may further be configured to properly manage the input and output configuration channel (CC) lines and data lines of the accessory device using a management circuit. In some cases, the management circuit of the accessory device may be configured to ensure that the input and output CC lines and data lines of the accessory device are compliant with USB-C standard requirements associated with the inputs of the accessory device (e.g., primary and/or alternative power sources) and the output of the accessory device (e.g., coupled to the primary device), regardless of what power sources are connected to the accessory device. For example, the management circuit may be configured to maintain an input impedance of the input CC lines and the output CC lines within a range based, at least in part, on at least one USB-C standard associated with the input CC lines and/or the CC output lines. In this example, the management circuit may be also be configured to pull up one of the CC output lines such that the CC output lines are complaint with at least one USB-C standard associated with the output CC lines.

An Example System

Figure 1:
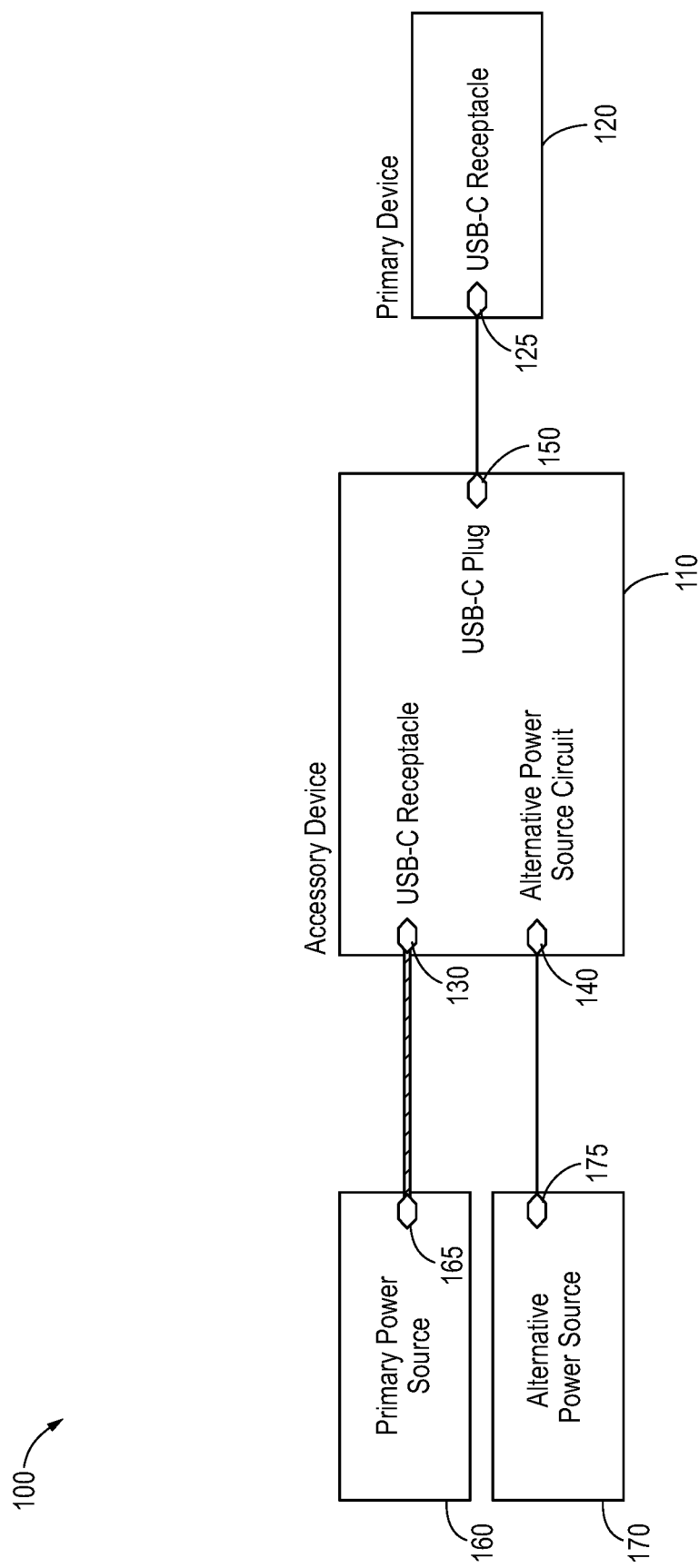
FIG. 1 illustrates an example system, in which aspects of the present disclosure may be implemented.
Figure 2:
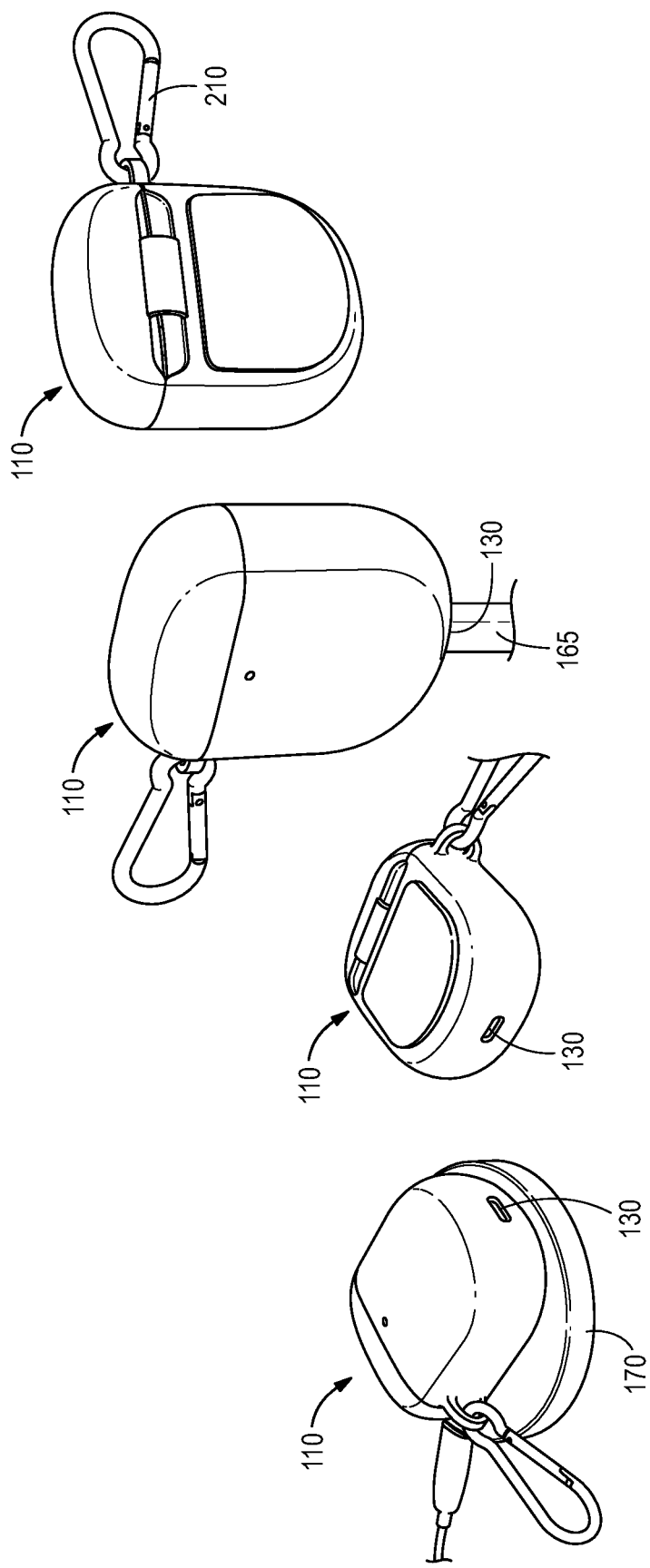
FIG. 2 illustrates an example device, in accordance with certain aspects of the present disclosure.

FIG. 1 illustrates an example system 100, in which aspects of the present disclosure may be implemented. As shown, the system 100 includes an accessory device 110. The accessory device 110 may be an accessory device 110 configured to be used with a primary device 120. The system 100 also includes a primary power source 160, at least one alternative power source 170, and the primary device 120. The primary device 120 may be a battery-operated device such as a cellular phone, a personal digital assistant (PDA), a handheld device, a wireless device, a laptop computer, a tablet, a smartphone, an Internet of things (IoT) device, a wearable device, an augmented reality (AR) device, or the like. The accessory device 110 may be configured to supply power received from a plurality of input power supply nodes to an output power supply node. For example, the accessory device 110 may be configured to receive power from one or more power sources (e.g., primary power source 160 and/or at least one alternative power source 170), and route the received power to the primary device 120. Although only a single alternative power source 170 is illustrated in FIGS. 1 and 2, any number of alternative power sources 170 may be used.

The primary power source 160 may be a universal serial bus (USB) power source, and may be implemented as or as part of an external power adapter, a portable battery, another device, or the like. The primary power source 160 may be configured to be coupled to the accessory device 110 via a USB plug 165 inserted into a USB-C receptacle 130 of the accessory device 110. The USB plug 165 may be a USB-A plug, a USB-C plug, a micro-USB plug, or the like. In some cases, the accessory device 110 and the USB power source 160 may be coupled to each other via a USB-C connection between the USB-C receptacle 130 and the USB plug 165 (implemented as a USB-C plug). For example, the accessory device 110 may be coupled to the USB power source 160 by a USB-C cable connection. When connected, the USB power source 160 may provide electrical power to the accessory device 110 through the USB connection resulting from the connection of the USB-C receptacle 130 and the USB plug 165.

The at least one alternative power source 170 may be implemented as or as part of a wireless charger (e.g., a Qi wireless charger), a backup battery (either external or internal to the accessory device 110), or an external power adapter. The alternative power source 170 may be configured to provide power to an alternative power supply circuit 140 of the accessory device 110 via a connection 175. In some cases, the connection 175 may be a wireless connection, and the alternative power source 170 may wirelessly provide power to the alternative power supply circuit 140. In other cases, the connection 175 may be a physical connection (e.g., a USB-C connection) and the alternative power source 170 may provide power to the alternative power supply circuit 140. The alternative power supply circuit 140 may include a wireless power receiver internal to the accessory device 110, and/or any other circuit configured to receive power from the alternative power sources 170. The power rating of the alternative power sources 170 may be known to the accessory device 110. In some cases, the alternative power source 170 may implemented with a wireless charger and may be in close proximity to the accessory device 110, and the alternative power supply circuit 140 may include or be implemented as a wireless power receiver. In these cases, the alternative power source 170 may provide electrical power to the accessory device 110 through the wireless connection resulting from the location of the alternative power source 170.

The accessory device 110 may be configured to be coupled to the primary device 120 via a USB-C plug 150 of the accessory device 110 inserted into a USB-C receptacle 125 of the primary device 120. The USB-C receptacle 125 may be configured to receive a USB-C plug. In some cases, the accessory device 110 and the primary device 120 may be coupled to each other via a USB-C connection between the USB-C receptacle 125 and the USB-C plug 150. In some cases, the connection between the accessory device 110 and the USB power source 160 does not involve the use of a cable, and may be a direct insertion of the USB-C receptacle 125 into the USB-C plug 150. When connected, the accessory device 110 may be configured to route electrical power (received from one or more of primary power source 160 or the alternative power source 170) to the primary device 120 through the USB connection resulting from the connection of the USB-C receptacle 125 and the USB-C plug 150.

In certain aspects, the primary device 120 may be a wearable audio output device and may be unable to utilize the alternative power source 170 and/or properly manage the primary power source 160 (e.g., implemented as a USB power source) and the alternative power source. In these aspects, the accessory device 110 may be used in conjunction with the primary device 120, and may receive power from one or more of the primary power source 160 and the alternative power source 170, and may route the received power to the primary device 120 through the USB-C plug 150. During this process, the accessory device 110 may manage one or more of the primary power source 160, the alternative power source 170, the USB-C receptacle 130, and the USB-C plug 150 to ensure compliance with USB-C standards at the USB-C receptacle 130 and the USB-C plug 150.

Example Devices for Managing Multiple Power Sources

FIG. 2 illustrates the example accessory device 110, according to certain aspects of the present disclosure. In the examples of FIG. 2, the alternative power source 170 is implemented as a wireless charger, and the USB-C receptacle 130 is implemented as a USB-C receptacle. In addition, in the example of FIG. 2, the primary power source 160 is implemented as a USB power source and is coupled to the accessory device 110 via a USB plug 165 implemented as a USB-C plug. According to certain aspects, the accessory device 110 may be configured to house the primary device 120 (not shown), and may be coupled to the primary device via the USB-C plug 150. The accessory device 110 may be configured to receive power from the primary power source 160 or the alternative power source 170, and route the received power to the primary device 120 housed inside the accessory device 110 via a USB connection between the USB-C plug 150 of the accessory device 110 and the USB-C receptacle 125 of the primary device 120.

The accessory device 110 is also illustrated with an optional carabiner clip 210 configured to allow a user to easily attach and detach the accessory device 110 from objects.

Figure 3:
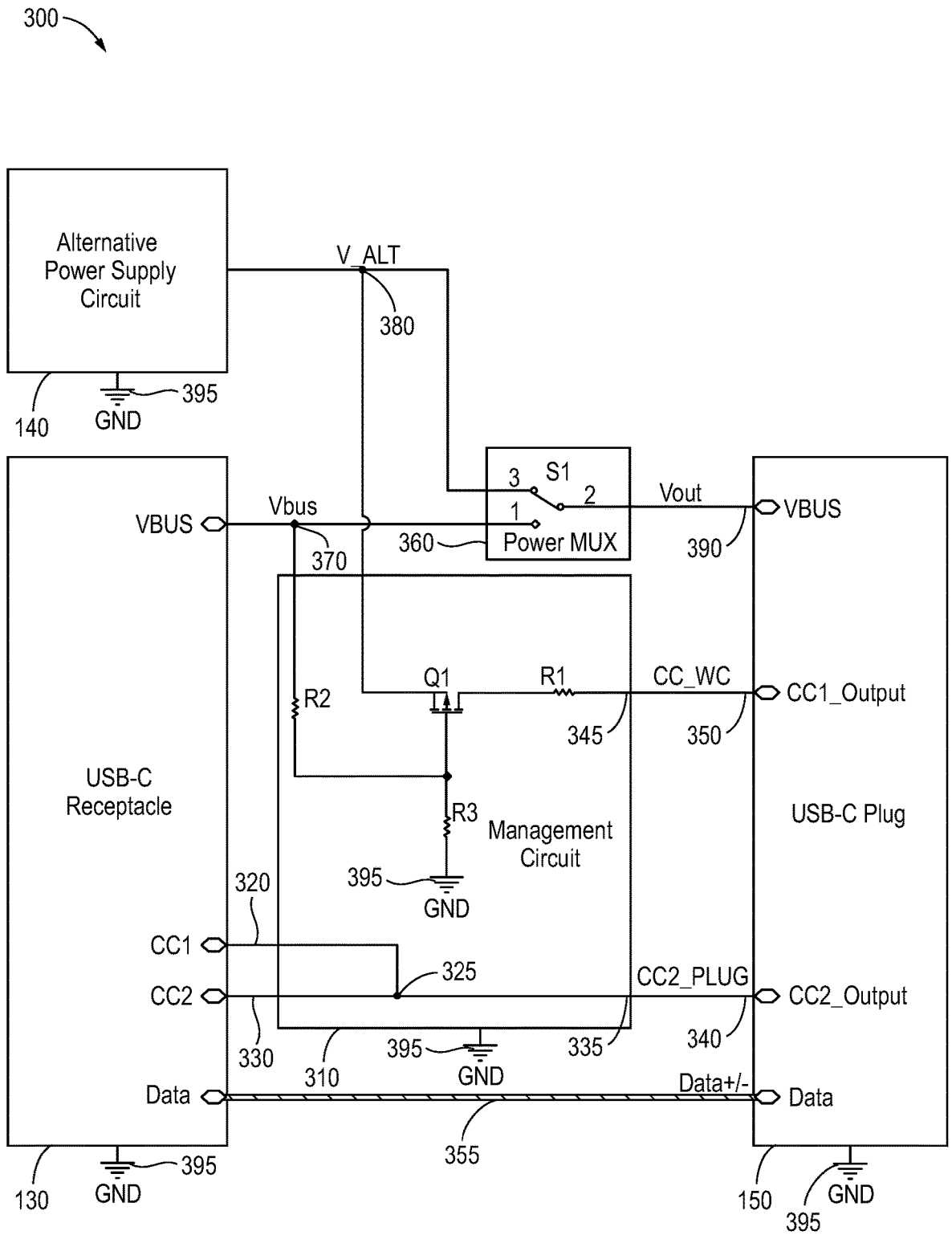
FIG. 3 is a circuit diagram of an example accessory device configured to receive power from two power sources, in accordance with certain aspects of the present disclosure.

FIG. 3 is a circuit diagram of an example accessory device (e.g., accessory device 300) configured to receive power from two power sources (e.g., a primary power source 160 and an alternative power source 170), in accordance with certain aspects of the present disclosure. The accessory device 300 may include the USB-C receptacle 130, the alternative power supply circuit 140, and the USB-C plug 150. The accessory device 300 may further include a management circuit 310 and a power MUX 360.

As illustrated in FIG. 3, the alternative power supply circuit 140 may be coupled to a reference potential node 395 (e.g., electric ground) and a first power supply node 380 (labeled "V_ALT"). The first power supply node 380 may be coupled to a first input of the power MUX 360 and a first switch (implemented by transistor Q1) included in the management circuit 310. Transistor Q1 may be coupled to a first CC output line 350 (labeled "CC_WC") via a first resistor (labeled "R1") and a first output node 345 of the management circuit 310. The transistor Q1 may be implemented with a P-channel metal-oxide-semiconductor field-effect transistor (MOSFET), as illustrated. In certain aspects, the transistor Q1 may include gate protection components (not illustrated). The first CC output line 350 may be coupled to the USB-C plug 150 of the accessory device 300. In certain aspects, the value of the first resistor R1 may be based on at least one of a USB-C standard or an output current rating of the alternative power source 170, which may be coupled to the alternative power supply circuit 140. As used herein, a USB-C standard may refer to any industry specifications that specify protocols for connecting, data transferring and powering of devices for connections between devices, such as USB-C connections.

The USB-C receptacle 130 may be coupled to a second input of the power MUX 360 via a second power supply node 370 (labeled "Vbus"). The second power supply node 370 may be coupled to a gate of the transistor Q1 via a second resistor (labeled "R2"), and may also be coupled to the reference potential node 395 via the second resistor and a third resistor (labeled "R3"). The second resistor R2 may be configured to be a pull up resistor of the transistor Q1. The third resistor R3 may be configured to be a pull down resistor of the transistor Q1.

The power MUX 360 may include an output coupled to an output power supply node 390 (labeled "Vout"). The power MUX 360 may be configured to multiplex between the primary power source 160 and the alternative power source 170 (e.g., using switch S1, as illustrated). The power MUX 360 may autonomously select one of the input(s) (e.g., the primary power source 160 and/or the alternative power source 170) which has a valid voltage. According to certain aspects, when a voltage at the first power supply node 380 is valid (e.g., the first power supply node 380 is coupled to an alternative power source 170 that is providing power) and a voltage at the second power supply node 370 is valid (e.g., the second power supply node 370 is coupled to the primary power source 160 that is providing power), the power MUX 360 may be configured to select the second power supply node 370 as the power supply of the accessory device 300. In these aspects, the power MUX 360 may be configured to route power from the second power supply node 370 to a primary device (e.g., the primary device 120) through the output power supply node 390.

The management circuit 310 may be coupled to the reference potential node 395, and may include an input node 325 coupled to one or more CC input lines 320 (labeled "CC1") and 330 (labeled "CC2"). The one or more CC input lines 320, 330 may be coupled to the USB-C receptacle 130 and may be disposed between the USB-C receptacle 130 and the management circuit 310. Although two CC input lines 320, 330 are illustrated in FIG. 3, any number of CC input lines may be used. The one or more CC input lines 320, 330 may be coupled to a second CC output line 340 (labeled "CC2_PLUG") via a second output node 335 of the management circuit 310. The USB-C receptacle 130 may also be coupled to the USB-C plug 150 via one or more data lines 355. The one or more data lines 355 may be configured to be a passthrough coupled between at least one data line of the USB-C plug 150 and at least one data line of the USB-C receptacle 130.

As described above, the accessory device 300 may be configured to receive power from one or more of the primary power source 160 and the alternative power sources 170, and route the received power to the primary device 120 through the USB-C plug 150. In certain aspects, the USB-C receptacle 130 may be configured as a power sink when the USB-C plug 150 is coupled to the primary device 120 (e.g., acting as an external sink), in accordance with USB-C standards. During this process, the accessory device 300 may manage one or more of the CC input lines 320, 330, the data lines 355, the first CC output line 350, or the second CC output line 340, regardless of which power sources are connected (e.g., primary power source 160 and/or alternative power supply source 170). In certain aspects, the accessory device 300 may ensure that the input impedance between the first CC input line 320 and the reference potential node 395 and/or the input impedance between the second CC input line 330 and the reference potential node 395 comply with the USB-C standards. That is, the management circuit 310 may be configured to maintain the input impedance between the first CC input line 320 and the reference potential node 395 and the input impedance between the second CC input line 330 and the reference potential node 395 within a range of input impedances based, at least in part, on at least one USB-C standard associated with the first CC input line 320 and/or the second CC input line 330. The management circuit may also be configured to maintain the input impedance between the first CC output line 350 and the reference potential node 395 and the input impedance between the second CC output line 340 and the reference potential node 395 within a range of input impedances based, at least in part, on at least one USB-C standard associated with the first CC output line 350 and/or the second CC output line 340. The management circuit 310 may also be configured to pull up one or more of the first CC output line 350 and the second CC output line 340, such that the USB-C plug 150 complies with USB-C standards for the first CC output line 350 and the second CC output line 340. The range may be a range of acceptable impedance values associated with USB-C standards. For example, the range of the acceptable impedance on the first CC input line 320, the second CC input line 330, the first CC output line 350, and the second CC output line 340 may be between 32 ohms and 93 ohms. In another example, the range may be between 75 ohms and 105 ohms.

According to certain aspects, the first power supply node 380 is receiving power from an alternative power source (e.g., alternative power source 170) and the second power supply node 370 is not coupled to a USB plug (e.g., USB plug 165 of a primary power source 160) via the USB-C receptacle 130. In these aspects, the management circuit 310 may be configured to turn on the transistor Q1, and pull up a voltage at the first CC output line 350 to a voltage at the first power supply node 380 using the first resistor R1. In addition, the value of the first resistor R1 may be based on at least one of a USB-C standard or an output current rating of the alternative power source 170, which may be coupled to the alternative power supply circuit 140. In some cases, the USB-C standard may be dependent on the output current rating of the alternative power source 170.

According to certain aspects, the first power supply node 380 is not receiving power from the alternative power source 170 and the second power supply node 370 is not coupled to the USB plug 165 of the primary power source 160. In these aspects, the management circuit 310 may be configured to turn off the transistor Q1 such that the first CC output line 350 is floating.

According to certain aspects, the first power supply node 380 is not receiving power from the alternative power source 170 and the second power supply node 370 is coupled to the USB plug 165 of the primary power source 160. In these aspects, the management circuit 310 may be configured to turn off the transistor Q1 such that the first CC output line 350 is floating. In addition, the second CC output line 340 may be shorted to at least one of the one or more CC input lines 320, 330, the output power supply node 390 may be coupled to a USB-C receptacle (e.g., USB-C receptacle 125) of the primary device 120, which pulls up at least one of one of the one or more CC input lines 320, 330. As a result, the primary device 120 may observe an impedance within a range that complies with USB-C standards on the second CC output line 340 at the USB-C receptacle 125.

According to certain aspects, the first power supply node 380 is receiving power from the alternative power source 170 and the second power supply node 370 is coupled to the USB plug 165 of the primary power source. In these aspects, the management circuit 310 may be configured to turn off the transistor Q1 such that the first CC output line 350 is floating, the second CC output line 340 is shorted to at least one of the one or more CC input lines 320, 330, and the output power supply node 390 is coupled to the USB-C receptacle 125 of the primary device 120, which pulls up at least one of one of the one or more CC input lines 320, 330. As a result, the primary device 120 may observe an impedance within a range that complies with USB-C standards on the second CC output line 340 at the USB-C receptacle 125.

Figure 4:
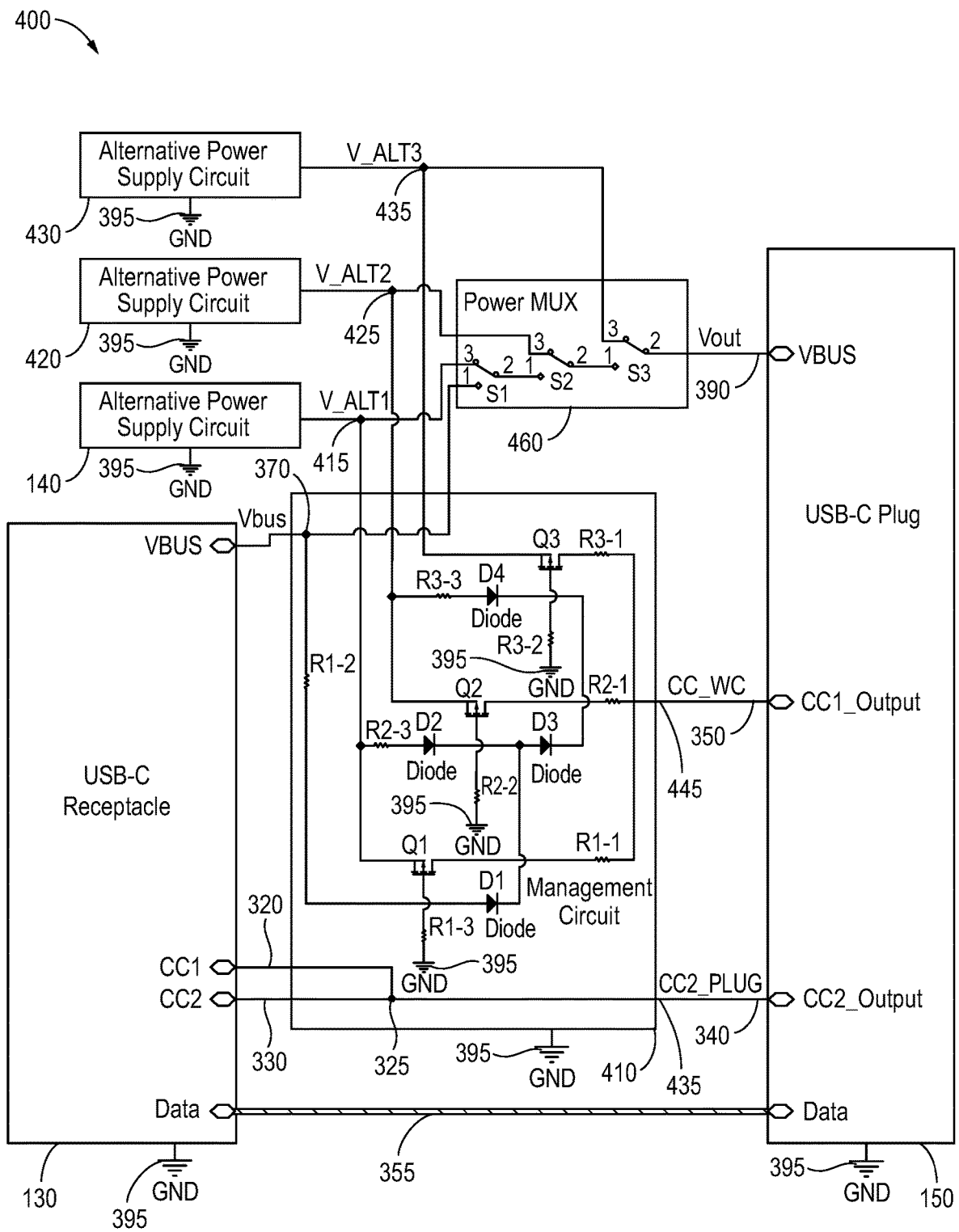
FIG. 4 is a circuit diagram of an example accessory device configured to receive power from more than two power sources, in accordance with certain aspects of the present disclosure.

FIG. 4 is a circuit diagram of an example accessory device (e.g., accessory device 400) configured to receive power from more than two power sources (e.g., primary power source 160 and a plurality of alternative power sources 170), in accordance with certain aspects of the present disclosure. The accessory device 300 may include the USB-C receptacle 130 and the USB-C plug 150. The accessory device 300 may further include a management circuit 410 and a power MUX 460.

The accessory device 400 may include a plurality of alternative power supply circuits 140, 420, 430, each configured to receive electrical power from one of a plurality of alternative power sources 170. For example, the alternative power supply circuit 140 may be configured to receive power from an alternative power source 170 implemented as a wireless charger (e.g., a Qi wireless charger), the alternative power supply circuit 420 may be configured to receive power from an alternative power source 170 implemented as a backup battery (either external or internal to the accessory device 110), and the alternative power supply circuit 430 may be configured to receive power from an alternative power source 170 implemented as an external power adapter. The alternative power supply circuits 140, 420, 430 may be coupled to a reference potential node 395 (e.g., electric ground).

The alternative power supply circuit 140 may be coupled to the reference potential node 395 and a first power supply node 415 (labeled "V_ALT1"). The first power supply node 415 may be coupled to a first input of the power MUX 460 and a first switch (implemented by transistor Q1) included in the management circuit 410. Transistor Q1 may be coupled to a first CC output line 350 via a first resistor (labeled "R1_1") and a first output node 445 of the management circuit 410. As illustrated, the transistor Q1 may be implemented with a P-channel MOSFET. In certain aspects, the transistor Q1 may include gate protection components (not illustrated). The first CC output line 350 may be coupled to the USB-C plug 150 of the accessory device 400. In certain aspects, the value of the first resistor R1_1 may be based on at least one of a USB-C standard or an output current rating of one of the alternative power sources 170, which may be coupled to the alternative power supply circuit 140.

The alternative power supply circuit 420 may be coupled to the reference potential node 395 and a second power supply node 425 (labeled "V_ALT2"). The second power supply node 425 may be coupled to a second input of the power MUX 460 and a second switch (implemented by transistor Q2) included in the management circuit 410. Transistor Q2 may be coupled to the first CC output line 350 via a second resistor (labeled "R2_1") and the first output node 445 of the management circuit 410. As illustrated, the transistor Q2 may be implemented with a P-channel MOSFET. In certain aspects, the transistor Q2 may include gate protection components (not illustrated). In certain aspects, the value of the second resistor R2_1 may be based on at least one of a USB-C standard or an output current rating of one of the alternative power sources 170, which may be coupled to the alternative power supply circuit 420.

The alternative power supply circuit 430 may be coupled to the reference potential node 395 and a third power supply node 435 (labeled "V_ALT3"). The third power supply node 435 may be coupled to a third input of the power MUX 460 and a third switch (implemented by transistor Q3) included in the management circuit 410. Transistor Q3 may be coupled to the first CC output line 350 via a third resistor (labeled "R3_1") and the first output node 445 of the management circuit 410. As illustrated, the transistor Q3 may be implemented with a P-channel MOSFET. In certain aspects, the transistor Q3 may include gate protection components (not illustrated). In certain aspects, the value of the third resistor R3_1 may be based on at least one of a USB-C standard or an output current rating of one of the alternative power sources 170, which may be coupled to the alternative power supply circuit 430.

The USB-C receptacle 130 may be coupled to a fourth input of the power MUX 460 via a fourth power supply node 370 (labeled "Vbus"). The fourth power supply node 370 may be coupled to a gate of the transistor Q1 via a fourth resistor (labeled "R1_2"), and may also be coupled to the reference potential node 395 via the second resistor R1_2 and a fifth resistor (labeled "R1_3"). The fourth resistor R1_2 may be configured to be a pull up resistor of the transistor Q1. The fifth resistor R1_3 may be configured to be a pull down resistor of the transistor Q1. The fourth power supply node 370 may also be coupled to a first diode D1.

The first power supply node 415 may also be coupled to a sixth resistor (labeled "R2_3") and a second diode D2. The second diode D2 may be coupled to a gate of the second transistor Q2, the reference potential node 395 through a seventh resistor (labeled "R2_2"), and a third diode D3. The second power supply node 425 may also be coupled to an eighth resistor (labeled "R3_3") and a fourth diode D4. The fourth diode D4 may be coupled to a gate of the third transistor Q3, the reference potential node 395 through a ninth resistor (labeled "R3_2"), and the third diode D3.

The power MUX 460 may include an output coupled to an output power supply node 390. The power MUX 460 may be configured to multiplex between the primary power source 160 and the alternative power sources 170 (e.g., using switches S1, S2, S3, as illustrated). The power MUX 460 may autonomously select the input (e.g., the primary power source 160 or the alternative power sources 170) which has a valid voltage. According to certain aspects, the power MUX 460 may be configured to select the fourth power supply node 370 as the power supply whenever the primary power source 160 is valid (e.g., when the accessory device 400 is receiving power from the primary power source 160 through the USB-C receptacle 130), regardless of whether any alternative power sources 170 are present and valid (e.g., via alternative power supply circuits 140, 420, 430). In these aspects, the power MUX 460 may be configured to route power from the fourth power supply node 370 to a primary device (e.g., the primary device 120) through the fourth power supply node 390.

The power MUX 460 may be configured to operate such that the USB-C receptacle 130 has first priority (e.g., the highest priority), the alternative power supply circuit 140 has second priority, the alternative power supply circuit 420 has third priority, and the alternative power supply circuit 430 has fourth priority (e.g., the lowest priority). For example, when the three alternative power sources 170 are all present, the power MUX 460 may be configured to select the alternative power supply circuit 140 as the power source.

The management circuit 410 may be coupled to the reference potential node 395, and may include an input node 325 coupled to one or more CC input lines 320, 330. The one or more CC input lines 320, 330 may be coupled to the USB-C receptacle 130 and may be disposed between the USB-C receptacle 130 and the management circuit 410. Although two CC input lines 320, 330 are illustrated in FIG. 4, any number of CC input lines may be used. The one or more CC input lines 320, 330 may be coupled to a second CC output line 340 via a second output node 435 of the management circuit 310. The USB-C receptacle 130 may be coupled to the USB-C plug 150 via one or more data lines 355. The one or more data lines 355 may be configured to be a passthrough coupled between at least one data line of the USB plug 165 and at least one data line of the USB-C receptacle 130.

In a similar manner to the accessory device 300 described above, the accessory device 400 may be configured to receive power from one or more of the primary power source 160 and the alternative power sources 170, and route the received power to the primary device 120 through the USB-C plug 150. In certain aspects, the USB-C receptacle 130 may be configured as a power sink when the USB-C plug 150 is coupled to the primary device 120 (e.g., acting as an external sink), in accordance with USB-C standards. During this process, the accessory device 400 may manage one or more of the CC input lines 320, 330, the data lines 355, the first CC output line 350, or the second CC output line 340, regardless of which power sources are connected (e.g., primary power source 160 and/or alternative power supply sources 170). In certain aspects, the accessory device 400 may ensure that the input impedance between the first CC input line 320 and the reference potential node 395 and/or the input impedance between the second CC input line 330 and the reference potential node 395 comply with the USB-C standards. That is, the management circuit 410 may be configured to maintain the input impedance between the first CC input line 320 and the reference potential node 395 and the input impedance between the second CC input line 330 and the reference potential node 395 within a range of input impedances based, at least in part, on at least one USB-C standard associated with the first CC input line 320 and/or the second CC input line 330. The management circuit may also be configured to maintain the input impedance between the first CC output line 350 and the reference potential node 395 and the input impedance between the second CC output line 340 and the reference potential node 395 within a range of input impedances based, at least in part, on at least one USB-C standard associated with the first CC output line 350 and/or the second CC output line 340. The management circuit 410 may also be configured to pull up either the first CC output line 350 or the second CC output line 340, such that the USB-C plug 150 complies with USB-C standards for the first CC output line 350 and the second CC output line 340.

According to certain aspects, the first power supply node 415 is receiving power from one of the alternative power sources 170, the second power supply node 425 and the third power supply node 435 are not receiving power from the alternative power sources 170, and the fourth power supply node 370 is not coupled to a USB plug (e.g., USB plug 165 of a primary power source 160 via the USB-C receptacle 130). In these aspects, the management circuit 410 may be configured to turn on transistor Q1, and pull up a voltage at the first CC output line 350 to a voltage at the first power supply node 415 using the first resistor R1_1.

According to certain aspects, the second power supply node 425 is receiving power from one of the alternative power sources 170, the first power supply node 415 and the third power supply node 435 are not receiving power from the alternative power sources 170, and the fourth power supply node 370 is not coupled to the USB plug 165 of the primary power source 160 (e.g., via the USB-C receptacle 130). In these aspects, the management circuit 410 may be configured to turn on transistor Q2, and pull up a voltage at the first CC output line 350 to a voltage at the second power supply node 425 using the second resistor R2_1.

According to certain aspects, the third power supply node 435 is receiving power from one of the alternative power sources 170, the first power supply node 415 and the third power supply node 425 are not receiving power from the alternative power sources 170, and the fourth power supply node 370 is not coupled to the USB plug 165 of the primary power source 160 (e.g., via the USB-C receptacle 130). In these aspects, the management circuit 410 may be configured to turn on transistor Q3, and pull up a voltage at the first CC output line 350 to a voltage at the third power supply node 435 using the third resistor R3_1.

According to certain aspects, two of the power supply nodes (e.g., the first power supply node 415 and the second power supply node 425) are receiving power from one of the alternative power sources 170, another of the power supply nodes (e.g., the third power supply node 435) is not receiving power from the alternative power sources 170, and the fourth power supply node 370 is not coupled to the USB plug 165 of a primary power source 160 (e.g., via the USB-C receptacle 130). In these aspects, the management circuit 410 may be configured to turn on transistor Q1 and turn off transistor Q2 and Q3, and pull up a voltage at the first CC output line 350 to a voltage at the first power supply node 415 using the first resistor R1_1.

According to certain aspects, two of the power supply nodes (e.g., the first power supply node 415 and the third power supply node 435) are receiving power from one of the alternative power sources 170, another of the power supply nodes (e.g., the second power supply node 425) is not receiving power from the alternative power sources 170, and the fourth power supply node 370 is not coupled to the USB plug 165 of the primary power source 160 (e.g., via the USB-C receptacle 130). In these aspects, the management circuit 410 may be configured to turn on transistor Q1 and turn off transistor Q2 and Q3, and pull up a voltage at the first CC output line 350 to a voltage at the first power supply node 415 using the first resistor R1_1.

According to certain aspects, two of the power supply nodes (e.g., the second power supply node 425 and the third power supply node 435) are receiving power from one of the alternative power sources 170, another of the power supply nodes (e.g., the first power supply node 415) is not receiving power from the alternative power sources 170, and the fourth power supply node 370 is not coupled to the USB plug 165 of the primary power source 160 (e.g., via the USB-C receptacle 130). In these aspects, the management circuit 410 may be configured to turn on transistor Q2 and turn off transistor Q1 and Q3, and pull up a voltage at the first CC output line 350 to a voltage at the second power supply node 415 using the second resistor R2_1.

According to certain aspects, the first power supply node 415, the second power supply node 425, and the third power supply node 435 are not receiving power from the alternative power source 170, and the second power supply node 370 is not coupled to the USB plug 165 of the primary power source 160 (e.g., via the USB-C receptacle 130). In these aspects, the management circuit 410 may be configured to turn off transistor Q1, transistor Q2, and transistor Q3 such that the first CC output line 350 is floating.

According to certain aspects, the first power supply node 415, the second power supply node 425, and the third power supply node 435 are not receiving power from the alternative power source 170 and the second power supply node 370 is coupled to the USB plug 165. In these aspects, the management circuit 410 may be configured to turn off transistor Q1, transistor Q2, and transistor Q3 such that the first CC output line 350 is floating. In addition, the second CC output line 340 may be shorted to at least one of the one or more CC input lines 320, 330, and the output power supply node 390 may be coupled to a USB-C receptacle (e.g., USB-C receptacle 125 via the USB-C plug 150) of the primary device 120, which pulls up at least one of one of the one or more CC input lines 320, 330. As a result, the primary device 120 may observe an impedance within a range that complies with USB-C standards on the second CC output line 340 at the USB-C receptacle 125.

According to certain aspects, the first power supply node 415, the second power supply node 425, and the third power supply node 435 are receiving power from the alternative power source 170 and the fourth power supply node 370 is coupled to the USB plug 165 (e.g., via the USB-C receptacle 130). In these aspects, the management circuit 410 may be configured to turn off transistor Q1, transistor Q2, and transistor Q3 such that the first CC output line 350 is floating. In addition, the second CC output line 340 is shorted to at least one of the one or more CC input lines 320, 330, and the output power supply node 390 is coupled to the USB-C receptacle 125 of the primary device 120 (e.g., via the USB-C plug 150), which pulls up at least one of one of the one or more CC input lines 320, 330. As a result, the primary device 120 may observe an impedance within a range that complies with USB-C standards on the second CC output line 340 at the USB receptacle 125. Regardless of how many alternative power supplies 170 are coupled to the accessory device 110 (e.g., via one of alternative power supply circuits 140, 420, 430) when the fourth power supply node 370 is coupled to the USB plug 165, the management circuit 410 may be configured to turn off transistor Q1, transistor Q2, and transistor Q3 such that the first CC output line 350 is floating.

Example Operations for Routing Power

Figure 5:
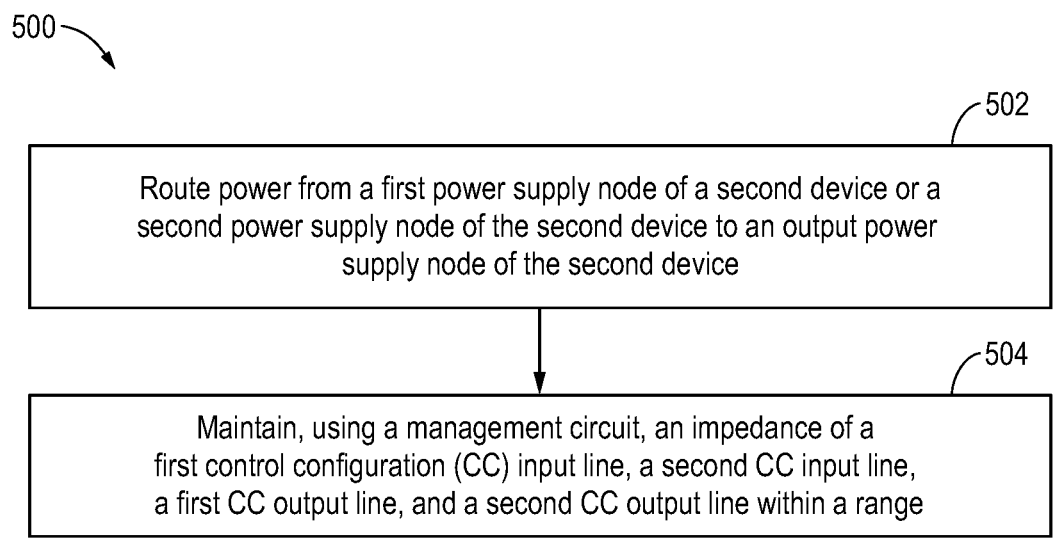
FIG. 5 is a flow diagram illustrating example operations for routing power to a first device performed by a second device, in accordance with certain aspects of the present disclosure.

FIG. 5 is a flow diagram illustrating example operations 500 for routing power to a first device (e.g., primary device 120) that may be performed by a second device (e.g., the accessory device 110, the accessory device 300, or the accessory device 400) for managing multiple power sources, in accordance with certain aspects of the present disclosure.

The operations 500 may begin, at block 502, routing power from a first power supply node (e.g., first power supply node 380) of a second device or a second power supply node (e.g., second power supply node 370) of the second device to an output power supply node (e.g., output power supply node 390) of the second device. The first power supply node may be configured to receive power from an alternative power source (e.g., alternative power source 170), and the second power supply node may be configured to be coupled to a universal serial bus (USB)-C plug (e.g., USB-C plug 165) of a primary power source (e.g., primary power source 160). The output power supply node may be configured to be coupled to the first device via a USB-C receptacle (e.g., USB-C receptacle 125).

At block 504, the second device may maintain, using a management circuit (e.g., management circuit 310 or management circuit 410), an impedance of a first CC input line (e.g., first CC input line 320), a second CC input line (e.g., the second CC input line 330), a first CC output line (e.g., first CC output line 350), and a second CC output line (e.g., second CC output line 340) within a range. The first CC input line and the second CC input line may be coupled to the second CC output line. For example, the second device may ensure that the input impedance between the first CC input line and the second CC input line and a reference potential node (e.g., reference potential node 395) of the second device complies with USB-C standards.

According to certain aspects, the management circuit may further include a first resistor (e.g., first resistor R1) coupled to the first CC output line, and a switch (e.g., transistor Q1) coupled between the first power supply node, the second power supply node, and the first resistor. In these aspects, the range may be based, at least in part, on at least one USB-C standard associated with the first CC input line and the second CC input line, and the management circuit may be further configured to pull up a voltage at the first CC output line or a voltage at the second CC output line.

In some aspects, when the first power supply node is receiving power from the alternative power source and the second power supply node is not coupled to the USB-C plug, the management circuit may be configured to close the switch, and pull up a voltage at the first CC output line to a voltage at the first power supply node using the first resistor.

In some aspects, when the first power supply node is not receiving power from the alternative power source and the second power supply node is not coupled to the USB-C plug, the management circuit may be configured to open the switch such that the first CC output line is floating.

In some aspects, the first power supply node is not receiving power from the alternative power source and the second power supply node is coupled to the USB-C plug. In these aspects, the management circuit may be configured to open the switch such that the first CC output line is floating, the second CC output line is shorted to the first CC input line and the second CC input line, the output power supply node is coupled to the USB receptacle, the USB-C receptacle is coupled to another device, and the other device may pull the first CC input line and the second CC input line. As a result, the first device may observe an impedance within a range that complies with USB-C standards on the second CC output line at the USB-C receptacle.

In some aspects, when the first power supply node is receiving power from the alternative power source and the second power supply node is coupled to the USB-C plug, the management circuit is configured to open the switch such that the first CC output line is floating, the second CC output line is shorted to the first CC input line and the second CC input line, the output power supply node is coupled to the USB-C receptacle, the USB-C receptacle is coupled to another device, and the other device may pull up the first CC input line and the second CC input line. As a result, the first device may observe an impedance within a range that complies with USB-C standards on the second CC output line at the USB-C receptacle.

Additional Considerations

It is noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The various operations of methods described above may be performed by any suitable means capable of performing the corresponding functions. The means may include various hardware and/or software component(s) and/or module(s), including, but not limited to a circuit, an application-specific integrated circuit (ASIC), or a processor. Generally, where there are operations illustrated in figures, those operations may have corresponding counterpart means-plus-function components with similar numbering.

The term "coupled" is used herein to refer to the direct or indirect coupling between two objects. For example, if object A physically touches object B and object B touches object C, then objects A and C may still be considered coupled to one another-even if objects A and C do not directly physically touch each other. For instance, a first object may be coupled to a second object even though the first object is never directly physically in contact with the second object.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A device, comprising:
   a first power supply node configured to receive power from an alternative power source;
   a second power supply node configured to be coupled to a universal serial bus (USB)-C plug of a primary power source;
   an output power supply node configured to be coupled to a USB-C receptacle, wherein the output power supply node is configured to be coupled to the first power supply node and the second power supply node; and
   a management circuit, comprising:
   an input node coupled to a first control configuration (CC) input line and a second CC input line, wherein the first CC input line and the second CC input line are coupled between the second power supply node and the management circuit;
   a first output node coupled to a first CC output line; and
   a second output node coupled to a second CC output line, wherein the first CC output line and the second CC output line are both coupled between the management circuit and the output power supply node, wherein the first CC input line and the second CC input line are coupled to the second CC output line, and wherein the management circuit is configured to maintain an impedance of the first CC input line, the second CC input line, the first CC output line, and the second CC output line within a range.

2. The device of claim 1, wherein the management circuit further comprises:
a first resistor coupled to the first CC output line; and
a switch coupled between the first power supply node, the second power supply node, and the first resistor, wherein the range is based, at least in part, on at least one USB-C standard associated with the first CC input line and the second CC input line, and wherein the management circuit is further configured to pull up a voltage at the first CC output line or a voltage at the second CC output line.

3. The device of claim 2, wherein when the first power supply node is receiving power from the alternative power source and the second power supply node is not coupled to the USB-C plug, the management circuit is configured to close the switch, and pull up the voltage at the first CC output line to a voltage at the first power supply node using the first resistor.

4. The device of claim 2, wherein when the first power supply node is not receiving power from the alternative power source and the second power supply node is not coupled to the USB-C plug, the management circuit is configured to open the switch such that the first CC output line is floating.

5. The device of claim 2, wherein when the first power supply node is not receiving power from the alternative power source and the second power supply node is coupled to the USB-C plug:
the management circuit is configured to open the switch such that the first CC output line is floating;
the second CC output line is shorted to the first CC input line and the second CC input line;
the output power supply node is coupled to the USB-C receptacle;
the USB-C receptacle is coupled to another device; and
the other device pulls up the first CC input line and the second CC input line.

6. The device of claim 2, wherein when the first power supply node is receiving power from the alternative power source and the second power supply node is coupled to the USB-C plug:
the management circuit is configured to open the switch such that the first CC output line is floating;
the second CC output line is shorted to the first CC input line and the second CC input line;
the output power supply node is coupled to the USB-C receptacle;
the USB-C receptacle is coupled to another device; and
the other device pulls up the first CC input line and the second CC input line.

7. The device of claim 2, wherein a value of the first resistor is based on at least one of a USB-C standard or an output current rating of the alternative power source.

8. The device of claim 2, wherein the switch comprises a transistor, and wherein a gate of the transistor is coupled to the second power supply node.

9. The device of claim 8, wherein:
the management circuit further comprises a second resistor and a third resistor both coupled between the gate of the transistor and the second power supply node;
the second resistor is configured to be a pull up resistor for the gate of the transistor; and
the third resistor is configured to be a pull down resistor for the gate of the transistor.

10. The device of claim 1, wherein the alternative power source comprises a wireless charger.

11. The device of claim 1, further comprising a data line pass through configured to be coupled between at least one data line of the USB-C plug and at least one data line of the USB-C receptacle.

12. The device of claim 1, further comprising a power multiplexer (MUX), comprising:
a first input coupled to the first power supply node;
a second input coupled to the second power supply node; and
an output coupled to the output power supply node.

13. The device of claim 12, wherein when a voltage at the first power supply node and a voltage at the second power supply node are each valid, the power MUX is configured to select the second power supply node.

14. A device, comprising:
a first power supply node configured to receive power from an alternative power source;
a second power supply node configured to be coupled to a universal serial bus (USB)-C plug of a primary power source;
an output power supply node configured to be coupled to a USB-C receptacle, wherein the output power supply node is configured to be coupled to the first power supply node and the second power supply node; and
a management circuit, comprising:
an input node coupled to a first control configuration (CC) input line and a second CC input line, wherein the first CC input line and the second CC input line are coupled between the second power supply node and the management circuit;
a first output node coupled to a first CC output line; and
a second output node coupled to a second CC output line, wherein the first CC output line and the second CC output line are both coupled between the management circuit and the output power supply node, wherein the first CC input line and the second CC input line are coupled to the second CC output line, and wherein the management circuit is configured to pull up a voltage at the first CC output line or the second CC output line.

15. A method for routing power to a first device, the method comprising:
routing power from a first power supply node of a second device or a second power supply node of the second device to an output power supply node of the second device, wherein the first power supply node is configured to receive power from an alternative power source, wherein the second power supply node is configured to be coupled to a universal serial bus (USB)-C plug of a primary power source, and wherein the output power supply node is configured to be coupled to the first device via a USB-C receptacle;
maintaining, using a management circuit, an impedance of a first control configuration (CC) input line, a second CC input line, a first CC output line, and a second CC output line within a range, wherein the first CC input line and the second CC input line are coupled to the second CC output line.

16. The method of claim 15, wherein the management circuit comprises:
a first resistor coupled to the first CC output line; and
a switch coupled between the first power supply node, the second power supply node, and the first resistor, wherein the range is based, at least in part, on at least one USB-C standard associated with the first CC input line and the second CC input line, and wherein the management circuit is further configured to pull up a voltage at the first CC output line or a voltage at the second CC output line.

17. The method of claim 16, wherein when the first power supply node is receiving power from the alternative power source and the second power supply node is not coupled to the USB-C plug, the management circuit is configured to close the switch, and pull up the voltage at the first CC output line to a voltage at the first power supply node using the first resistor.

18. The method of claim 16, wherein when the first power supply node is not receiving power from the alternative power source and the second power supply node is not coupled to the USB-C plug, the management circuit is configured to open the switch such that the first CC output line is floating.

19. The method of claim 16, wherein when the first power supply node is not receiving power from the alternative power source and the second power supply node is coupled to the USB-C plug:
the management circuit is configured to open the switch such that the first CC output line is floating;
the second CC output line is shorted to the first CC input line and the second CC input line;
the output power supply node is coupled to the USB-C receptacle;
the USB-C receptacle is coupled to another device; and
the other device pulls up the first CC input line and the second CC input line.

20. The method of claim 16, wherein when the first power supply node is receiving power from the alternative power source and the second power supply node is coupled to the USB-C plug:
the management circuit is configured to open the switch such that the first CC output line is floating;
the second CC output line is shorted to the first CC input line and the second CC input line;
the output power supply node is coupled to the USB-C receptacle;
the USB-C receptacle is coupled to another device; and
the other device pulls up the first CC input line and the second CC input line.

* * * * *